PLURAL MODULATION COMMUNICATION SYSTEM

Filed March 27, 1961 8 Sheets-Sheet 1

INVENTORS.
D.W. BRAMER
AND H.C. SIBLEY
BY Forest B. Hitchcock
THEIR ATTORNEY

INVENTORS.
D.W. BRAMER
AND H.C. SIBLEY
BY
Forest B. Hitchcock
THEIR ATTORNEY

INVENTORS.
D.W. BRAMER
AND H.C. SIBLEY
BY
Forest B. Hitchcock
THEIR ATTORNEY

INVENTORS.
D.W. BRAMER
AND H.C. SIBLEY
BY Forest B. Hitchcock
THEIR ATTORNEY

PLURAL MODULATION COMMUNICATION SYSTEM

Filed March 27, 1961 8 Sheets-Sheet 5

INVENTORS.
D.W. BRAMER
AND H.C. SIBLEY
BY Forest B. Hitchcock
THEIR ATTORNEY

INVENTORS.
D.W. BRAMER
AND H.C. SIBLEY
BY
Forest B. Hitchcock
THEIR ATTORNEY

*INVENTORS.*
D.W. BRAMER
AND H.C. SIBLEY

*BY* Forest B. Hitchcock

THEIR ATTORNEY

PLURAL MODULATION COMMUNICATION SYSTEM

Filed March 27, 1961 8 Sheets-Sheet 8

INVENTORS.
D.W. BRAMER
AND H.C. SIBLEY

BY Forest B. Hitchcock
THEIR ATTORNEY

United States Patent Office 3,178,515

Patented Apr. 13, 1965

3,178,515

PLURAL MODULATION COMMUNICATION SYSTEM

Donald W. Bramer, Rochester, and Henry C. Sibley, Spencerport, N.Y., assignors to General Signal Corporation, a corporation of New York Filed Mar. 27, 1961, Ser. No. 98,527

2 Claims. (Cl. 179—15)

The present invention relates to a communication system, and more particularly to a method and apparatus for transmitting and detecting information between a remote location and a central office location over a single line circuit. Specifically, the present invention relates to a method and system of communication which permits the use of a single tone frequency to provide a plurality of independent unrelated information channels.

In communication systems using carrier transmission, tone frequencies are used to modulate the carrier frequency produced by the carrier transmitter. The carrier transmitter superimposes the tone modulated carrier onto the line circuit. In communication systems using direct transmission, the tone frequencies are amplified and applied directly to the line circuit.

Heretofore, in known telemetering systems of this type, digital and analog information was transmitted simultaneously directly over a pair of line wires or by virtue of a carrier transmitter, by either pulse width modulating or frequency modulating each individual tone. This required a single tone for each separate channel of information. Thus, the amount of information that could be transmitted simultaneously over a single line wire was limited by the number of tone frequencies which could be included within the available band width of the carrier frequency at any one time.

One of the objects of the present invention is to provide an improved method and system for communicating information.

Another object of this invention is to provide a method and system for communicating information which permits the information to be transmitted by the modulation of a single tone which heretofore required the modulation of a plurality of tones.

Another object of this invention is to provide a communication system wherein a single tone frequency is used to provide a plurality of channels of information by simultanously frequency modulating, pulse width modulating, pulse-position modulating and amplitude modulating the tone.

A further object of this invention is to provide a communication system wherein one channel of information may be transmitted by frequency shifting the tone in one direction, and digital information is transmitted by frequency shifting this same tone in the opposite direction between information pulses of the one channel, or when the one channel is not transmitting.

A still further object of this invention is to provide a communication system wherein either digital or analog information may be transmitted by the pulse width modulation of the tone, and additional information may be transmitted by amplitude modulating the tone.

A still further object of this invention is to provide a communication system wherein a plurality of analog and/or digital information channels are provided by the modulation of a single tone frequency, and a plurality of different tone frequencies may be transmitted simultaneously over the same line circuit.

A still further object of this invention is to provide a communication system of the character described wherein a control is provided by selectively muting the generated tone.

A still further object of this invention is to provide a communication system adapted for telemetering which is versatile and reliable in its operation.

Other objects of this invention will become apparent from the specification, the drawings, and the appended claims.

Figure 1A:
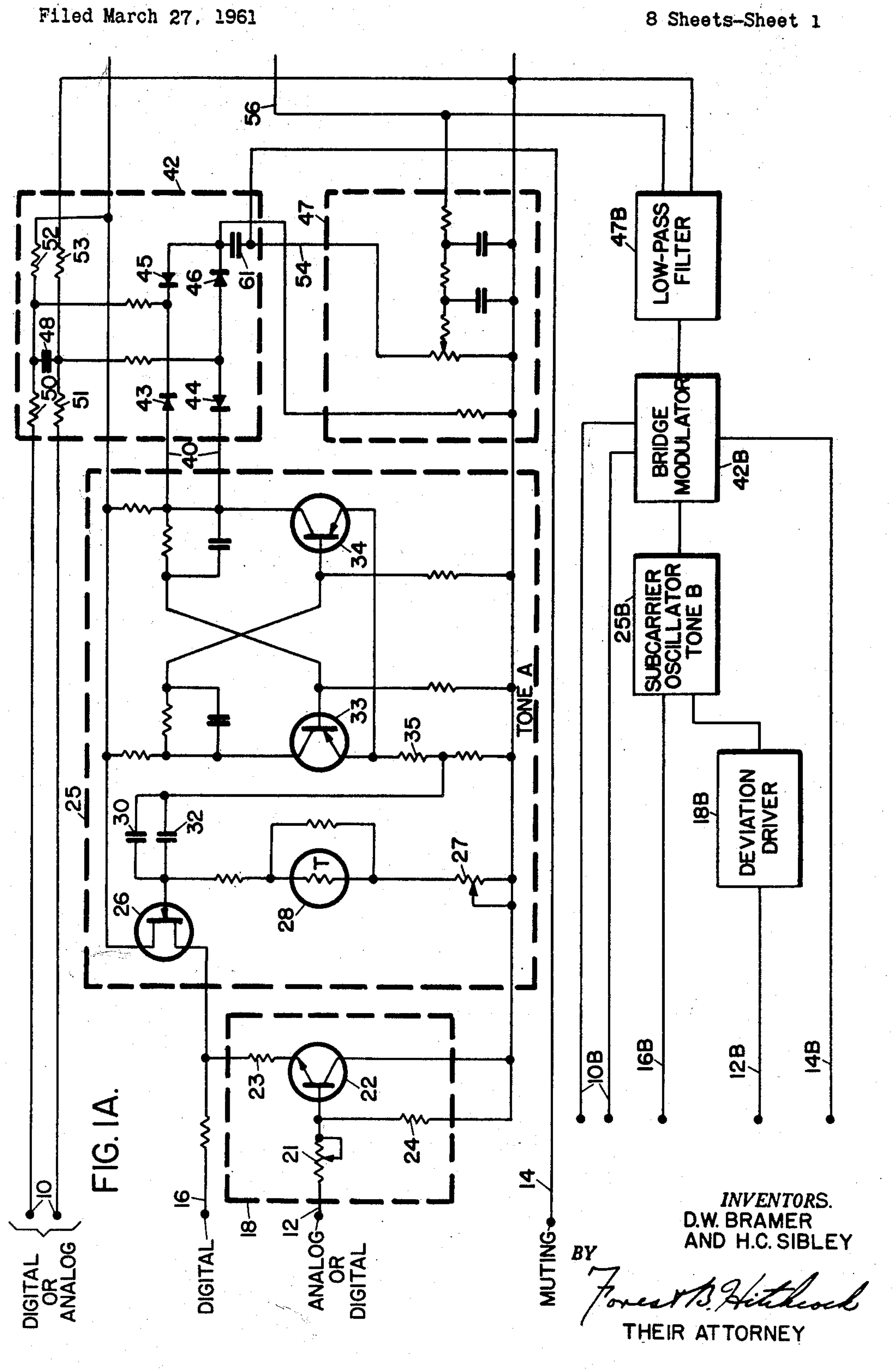
FIGS. 1A and 1B illustrate partly in block form and partly schematically the apparatus and circuitry of a subcarrier generator unit constructed according to one embodiment of this invention.

In accordance with the present invention two methods are available for transmission, either a tone modulated carrier or direct wire. With the modulated carrier transmission, audio tone frequencies modulate the carrier frequency which is produced by the carrier transmitter. With direct transmission, the audio tone frequencies are applied directly to the line circuit. At the sending location, a subcarrier generator unit supplies and permits modulation of the tone frequencies. At the receiving location, a demodulator unit is provided, which extracts and separates the individual information channels of each tone to furnish separate information outputs.

In the illustrated embodiments of the invention, each subcarrier generator unit is provided with means for applying a plurality of channels of information to each tone, simultaneously. For example, according to the one embodiment either digital or analog information may be applied to a first input channel for pulse width modulating the tone. Each of the pulses are of constant amplitude, but vary in duration and the initiation time at which they occur. In other words this type of modulation is pulse width modulation combined with pulse position modulation. Simultaneously, other information may be applied to a second input channel to frequency shift this same tone in one direction. When this other information is not being applied to shift the frequency in the one direction, other digital information may be applied to a third input channel to shift the frequency of the same tone in the opposite direction. A fourth input channel is provided for muting this same tone. In the modified form of the invention, still another channel of information may be applied to the first input channel to amplitude modulate each pulse of this tone to values between that amplitude which is fixed for the pulse width modulation and an intermediate amplitude. The demodulator unit at the control office is provided with means for separating each of the individual tone frequencies that are simultaneously applied to the line circuit. The frequency modulation of each tone is detected and converted to provide output pulses similar to the input pulses of one information channel, and the pulse width modulation is detected simultaneously and converted to provide output pulses similar to the input pulses of another channel of information. Each tone is also detected to provide a constant output at the receiving office. According to the modification, the demodulator unit is additionally provided with means for recovering additional information transmitted by the variable amplitude modulation of the tone frequency.

Referring to the drawings, and particularly to FIGS.

1A and 1B, a two tone subcarrier generator unit is illustrated partly schematically and partly in block form. This unit as illustrated is capable of generating and permitting the modulation of two distinct tone frequencies, tone frequency A, and tone frequency B. That part of the unit which is common to both tones is illustrated in detail in FIG. 1B. That portion of the unit which is concerned with modulation of tone A is also illustrated in detail in FIG. 1A, while the corresponding apparatus for generating and modulating tone B is in block form and is of idenical circuit configuration to the detailed circuitry of tone A, which has like reference characters, except that the reference characters for the tone B apparatus bear a suffix B. In accordance with the needs of practice, however, a subcarrier generator unit according to the present invention may be constructed to generate and modulate more than two distinct tones.

For each tone generated by the subcarrier unit, there is provided a plurality of input channels for modulating a respective tone. With respect to tone A, there is provided an input 10 which may be connected to either a source of digital information, such as a relay contact, or analog information such as a potentiometer. Either the digital or analog information source that is connected to the input 10 is expressed as a series of constant amplitude pulses such as shown by waveform 11 of FIG. 3. The application of these pulses, which may vary in width and point of time initiation causes a reduction in the amplitude of the tone for the duration of the pulse, thus pulse width modulating the tone as shown by waveform 15 of FIG. 3.

Figure 2A:
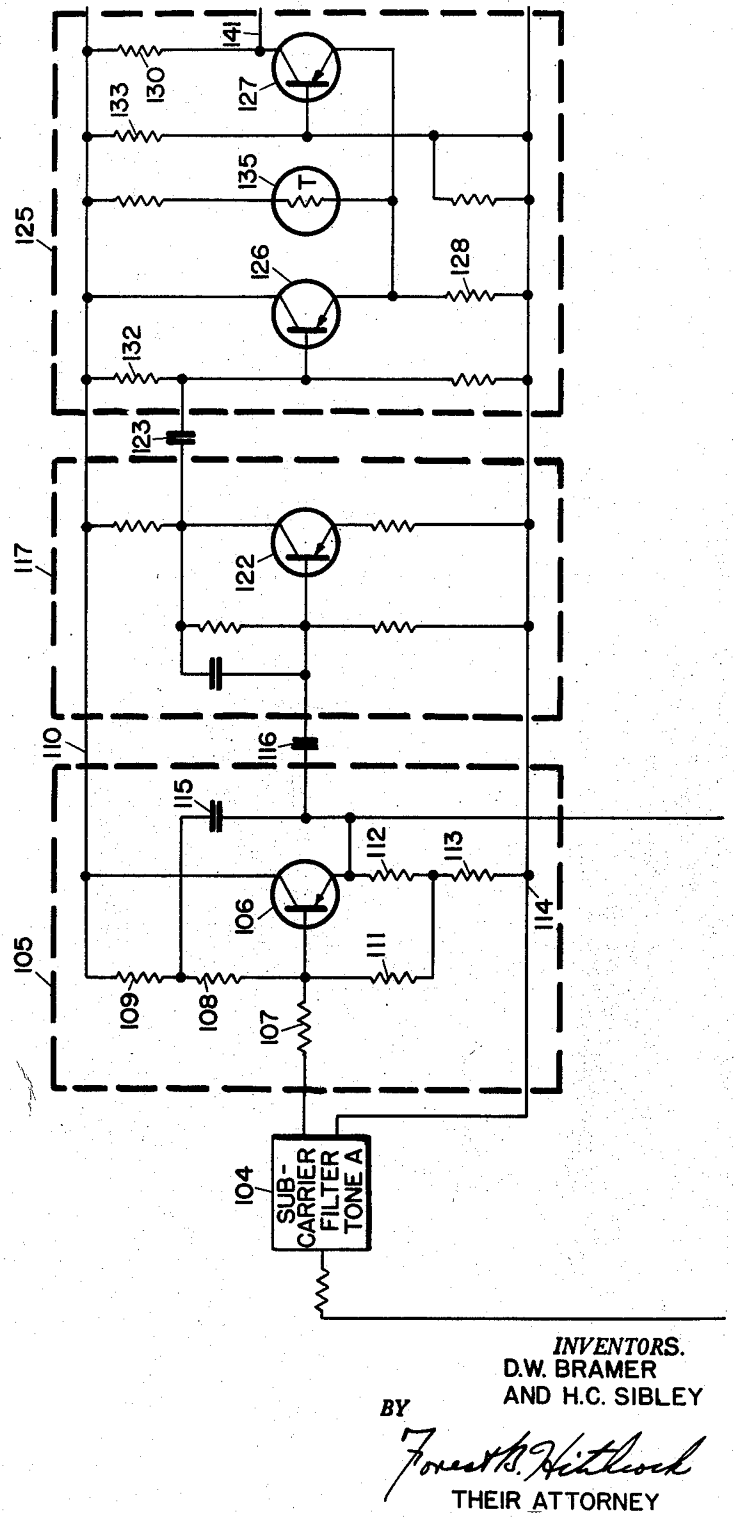
FIGS. 2A, 2B, 2C and 2D illustrate partly in block form and partly schematically the apparatus and circuitry of a demodulating unit according to one embodiment of the invention.
Figure 2B:
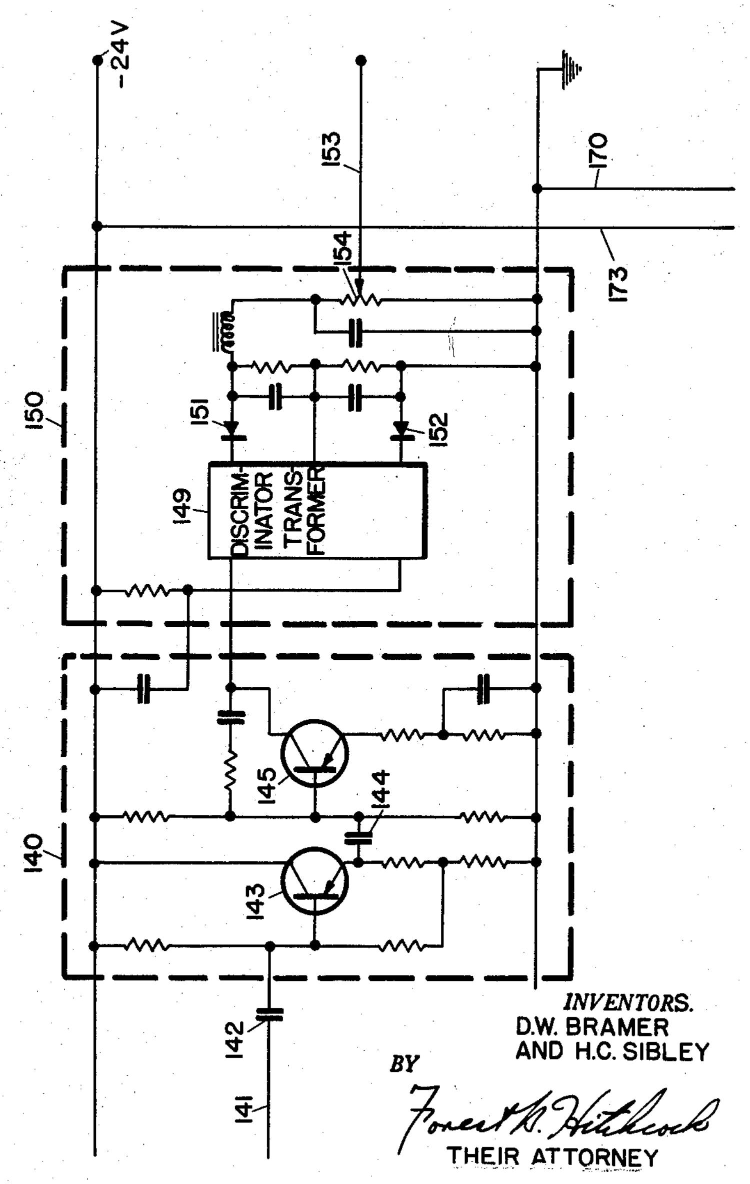
Figure 2C:
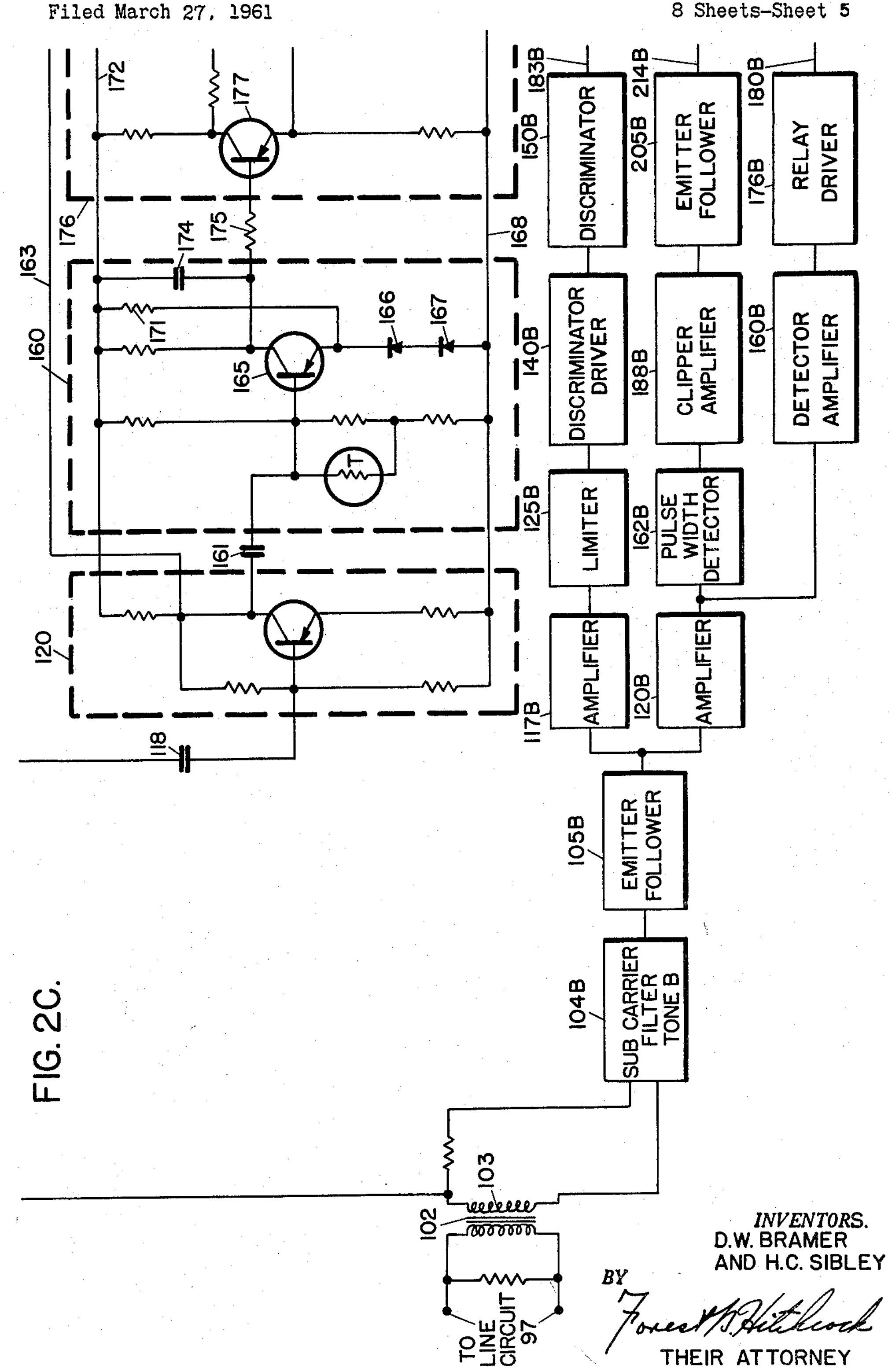
Figure 2D:
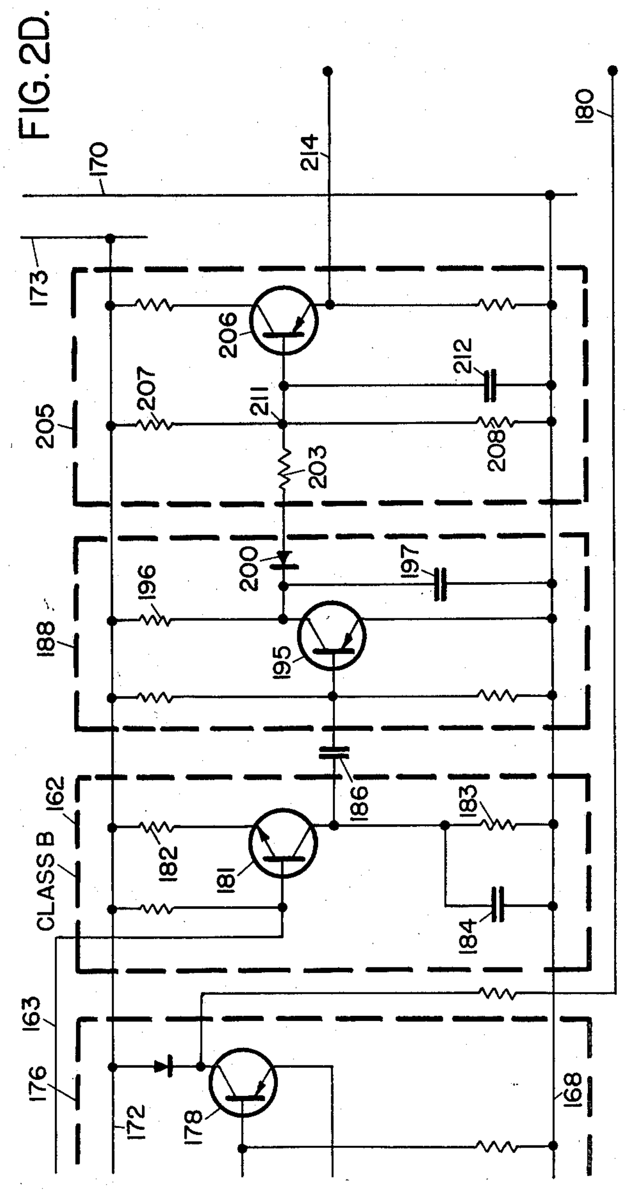
Figure 3:
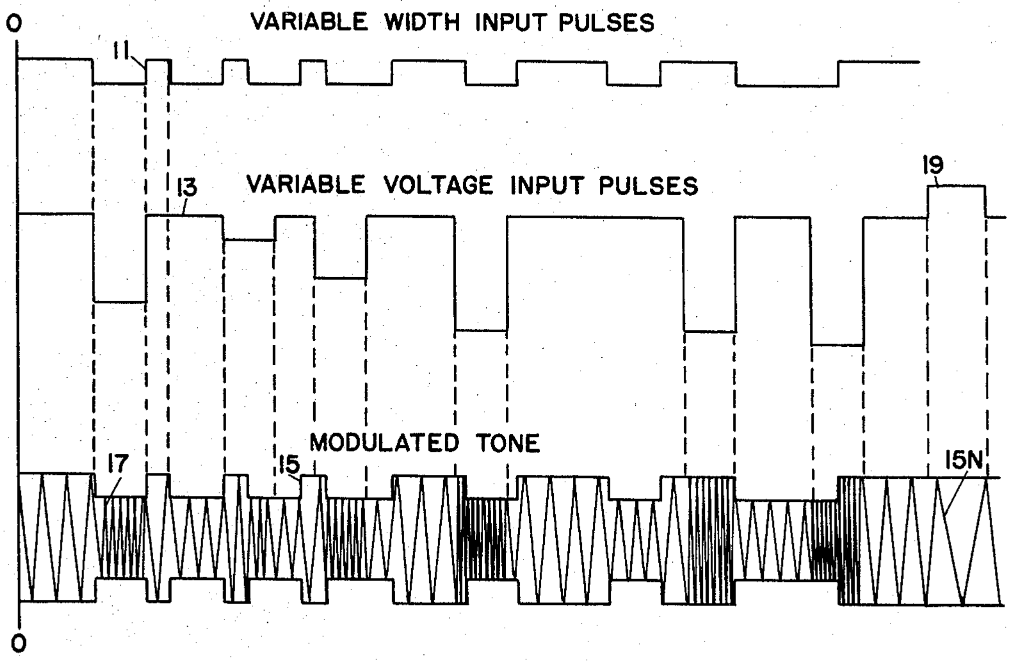
FIG. 3 illustrates typical waveforms to show the overall operation of this embodiment of the invention.

Another information source which is preferably analog but may be digital, is connected to an input 12 which applies through a conventional transducer, for example, a sequence of variable amplitude voltage pulses such as shown by waveform 13 of FIG. 2, which causes the frequency of the tone to shift upwardly in proportion to the magnitude of the pulses as shown by waveform 17 of FIG. 3. A tone muting source, such as a closed relay contact, or a steady on or off voltage source, is connected to an input 14 which may be used for operating a relay, for example, at the receiving station at the beginning and the end of an information transmission period. A separate source of digital information may be applied to the input 16 for frequency shifting the tone downwardly as shown by the waveform referred to at 15N in FIG. 3; at times when information is not being applied to the input 12 to shift the tone upwardly as shown by pulse 19 in the waveform 13 of FIG. 3.

The input information applied to wire 12 is connected to a deviation driver 18, which determines the upward frequency shift that occurs for each unit of voltage deviation of the input information. The deviation driver 18 (FIG. 1A) is comprised of a potentiometer 21, an NPN transistor 22, and resistors 23 and 24. The transistor 22 is so connected to be actually an emitter follower, which provides an isolation stage to control the deviation of the frequency, without affecting the base frequency of the tone when information is removed from the input wire 12. The potentiometer 21, which is connected to the base of the transistor 22 may be adjusted to control the amount of deviation of the freqnency for each unit of voltage input on the wire 12.

A free running relaxation oscillator 25 which generates the tone A, has one portion which is comprised of a unijunction relaxation oscillator transistor 26, one terminal of which is normally biased by a constant potential on the input wire 16, and a potentiometer 27. The potentiometer 27 may be adjusted to produce the required base frequency of the tone A. A temperature compensating part of the oscillator 25 is provided, which is comprised of a thermistor element 28 to prevent the frequency of the oscillator 25 from drifting during temperature changes. A capacitor 30 is connected to the emitter of the transistor 26 which serves as a low voltage trimmer. A capacitor 32 is connected to the emitter terminal of the transistor 26 in parallel with the capacitor 30. The point at which the capacitor 32 must charge to cause the transistor 26 to conduct is controlled by the deviation driver 18, which determines the frequency change of the tone. The output from the capacitor 32 on which there is a sawtooth waveform is connected to the input of a multivibrator portion of the oscillator 25. The multivibrator portion is comprised of PNP transistors 33 and 34, the emitter terminals of which are connected through a resistor 35 to the output of the capacitor 32. The free running relaxation oscillator produces a sawtooth output which is used to trigger the bistable multivibrator circuit from one state to the other on alternate pulses. Thus, the multivibrator divides the original frequency in half, which permits the use of smaller sized components in the frequency determining networks. An oscillator constructed according to this embodiment of the invention has excellent stability, large symmetrical signal output and is not prone to "lock up" or non-oscillation. In addition, according to the present invention, the operating frequency is altered linearly in proportion to the D.C. voltages applied to the input 12 over a relatively wide range. In practice, the base frequency of the tone A is set to the lower edge of its related telemeter band and shifted upwardly in proportion to the amplitude of the applied negative input pulses on wire 12. Square wave output pulses, as caused by the multivibrator portion of the oscillator 25 are applied to output wires 40 which are connected to the input of a bridge type modulator 42.

The modulator 42 is comprised of diodes 43, 44, 45 and 46, which are connected in a bridge circuit arrangement, and serve to conduct the output frequency from the oscillator 25 to a low pass filter 47. This bridge type modulator 42 maintains the carrier base line preventing any undesirable outputs with digital or analog modulation on the input 10, as will be hereinafter described. The modulator 42 is also provided with a capacitor 48 that provides a time constant for cutting out the square waves from the oscillator 25, which would otherwise produce an undesirable ringing and filter effect at the receiving end.

The modulator 42 which is also comprised of resistors 50, 51, 52 and 53, are of the proper values in accordance with the desired maximum degree of amplitude of the modulation of the tone frequency. The tone is amplitude modulated by a fixed amount each time the input wires 10 are short-circuited. The shorting of the wires 10 decreases the amplitude of the tone frequency by a fixed amount for the duration of the short in the order of 6 db, for example. The information is provided by the length of time that this shorting of the wires 10 is existent to provide a pulse width modulation of the tone. The degree of decreased amplitude or attentuation of the tone is at a fixed amount each time the pulse occurs. If analog information is to be provided at the input 10, other apparatus well known in the art could be connected in a well known manner to the input 10 to control the duration of the shorting in accordance with the amplitude of such information. A digital channel of information may be applied to the wire 16 by changing the bias on the base of the unijunction transistor 26 when no other channel of information is being transmitted via the input 12, that is, when the frequency of the oscillator is at its base frequency.

Thus, the tone A which is simultaneously frequency modulated and decreased to a fixed amplitude for different durations to produce different pulse widths is applied to output wire 54 which is the input of the low pass filter 47.

Figure 1B:
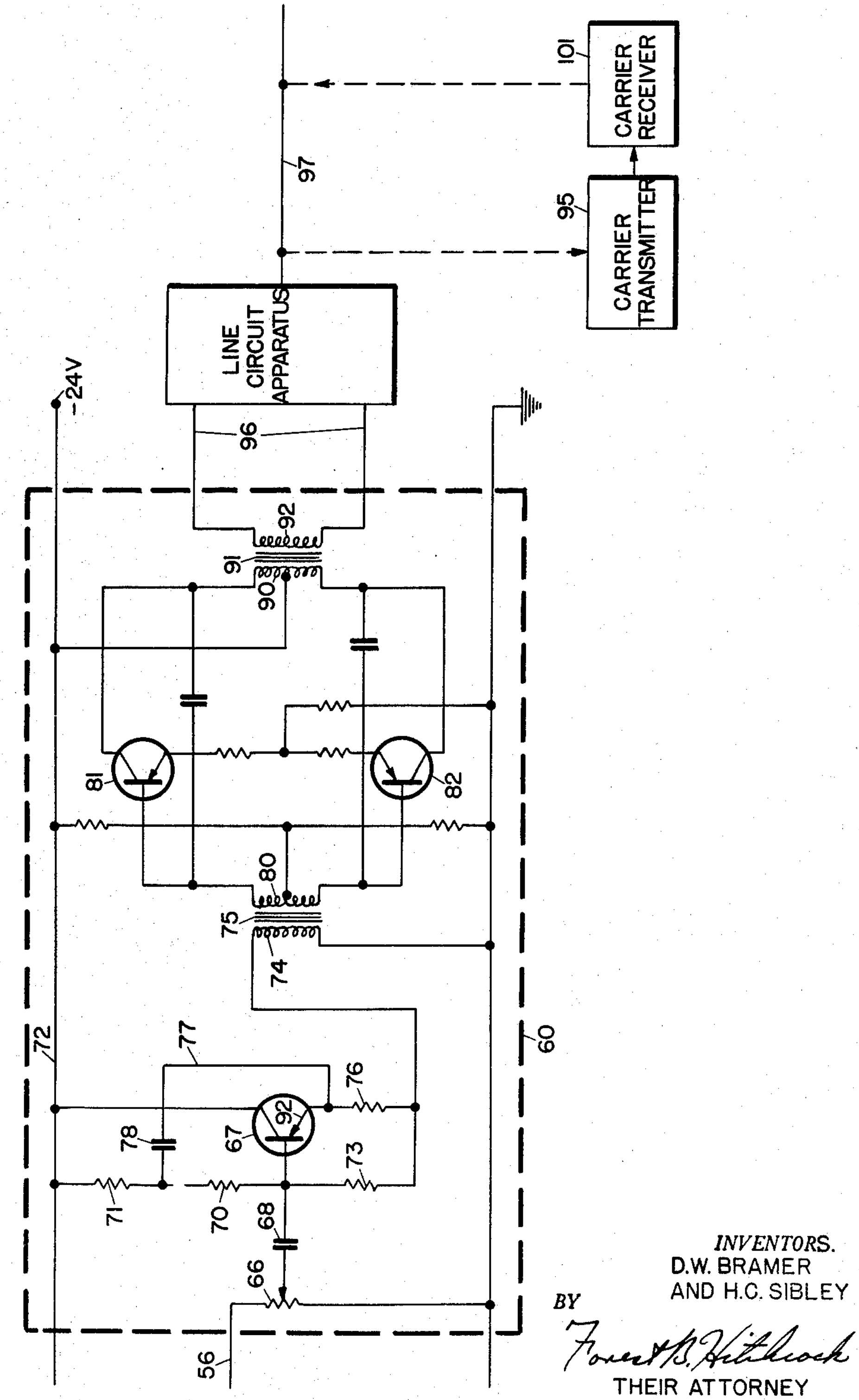

The low pass filter 47, which is comprised of a well known integrating network serves to round off the squareness of the tone pulses that are applied to output wire 56, which is connected to the input of an output amplifier 60 (FIG. 1B). The low pass filter 47 is an RC type and removes harmonics which results in a more sinusoidal signal.

The muting wire or input 14 (FIG. 1A) normally connects one side of a capacitor 61 of the modulator 42 to ground. When this ground connection is removed, such as by the opening of a relay contact for example, the signal output from the modulator 42 is reestablished into the low pass filter network 47.

Apparatus for generating and modulating the distinct tone B is illustrated in block form in FIG. 1A and is identical to the apparatus for generating and modulating the tone A. The corresponding input channels and the apparatus are provided with like reference characters, only having the suffix B. The output from the low pass filter 47B is connected also to the common output wire 56. In actual practice, it has been found practical to combine the outputs of up to four distinct tones by connecting them to the output wire 56. This composite signal, composed of the two subcarrier tones A, and B, each of which is frequency modulated and amplitude modulated at a fixed amount to provide the pulse width modulation is then amplified by a low distortion class A amplifier 60.

The output amplifier 60 of the subcarrier generator unit has a potentiometer 66 connected to the input wire 56, which may be adjusted to determine the level of the composite signal from the low pass filters 47 and 47B. The amplifier 60 has a driving portion which is comprised of a PNP transistor 67, the base of which is connected to the potentiometer 66 through a capacitor 68. The base of the transistor 67 is also connected through series connected resistors 70 and 71 to bus 72 that is connected to the negative terminal of a twenty-four volt supply source, and is further connected through a resistor 73 to primary winding 74 of a transformer 75. The collector of the transistor 67 is connected directly to the bus 72. The emitter of the transistor 67 is connected through a resistor 76 to the primary winding 74 of the transformer 75. A separate wire 77 connects the emitter through a capacitor 78 between the resistors 70 and 71. The capacitor 78 is of such a value, so that this circuit connector serves as an alternating current low impedance circuit at the operating frequencies, but acts as a high impedance to the D.C. voltage from the emitter. This connection also overcomes the limiting input impedance provided by the resistor 73. Thus, this circuit connection presents a higher input impedance than is normally obtained with a conventional emitter follower network, which permits the least load on the filters 47, and 47B, and yet gives a low impedance source to drive the push-pull amplifier.

The transformer 75 has a secondary winding 80 which is connected to the base terminals of PNP transistors 81 and 82 in a conventional push-pull amplifier circuit arrangement. The collector terminals of the transistors 81 and 82 are connected to primary winding 90 of an output transformer 91. The transformer 91 is coupled through its secondary winding 92 to either a carrier transmitter 95 by wires 96 or connected directly to a line circuit 97 (FIG. 1A). The carrier transmitter 95 may be any conventional transmitter which is well known in the art, and the line circuit 97 may be a 600 ohm balanced line, for example.

At the receiving location, a demodulator unit is provided which may be operated by the composite output signals from a conventional carrier receiver, such as that referred to at 101 (FIG. 1B) or directly from the transmission line circuit 97.

The demodulator unit according to the embodiment illustrated in FIGS. 2A through 2D serves to demodulate the frequency shifted tone to provide output signals in the exact replica to the input pulses provided at inputs 12 and 16 (FIG. 1A). It also detects the pulse modulation of each tone to reproduce output pulses in accordance with the information channel of input 10. The demodulator unit further detects the presence of each subcarrier tone and through rectification provides a direct current control signal output, which may be used to operate a relay for example.

The composite tone signals received are coupled into the unit through an input transformer 102, which is a balancing transformer. The transformer 102 is connected by its secondary winding 103 to a subcarrier filter 104 and a subcarrier filter 104B. Each filter 104 and 104B acts to restore the respective tones from the composite input signal. The subcarrier 104 restores the tone A and the filter 104B restores the tone B. In the embodiment of the invention shown in the drawings, the demodulator unit is provided to detect and separate the information from two distinct tones. In accordance with the needs of practice, a demodulator unit may be constructed to detect and separate the information from more than two tones, such as four distinct tones for example.

In describing the detailed circuitry of the demodulator unit, the apparatus and its various connections will be described with respect to the detection of the information for the tone A. The apparatus and circuitry for detecting the information from tone B is identical to that of tone A and is referred to with similar reference characters where appropriate only having the suffix B.

The output from the filter 104 is connected to an emitter follower stage 105 to terminate the filter in a high impedance. This stage 105 is comprised of a PNP transistor 106, the base of which is connected through a resistor 107 to the filter 104. The base of the transistor 106 is also connected through series connected resistors 108 and 109 to a bus 110 which is connected to the negative terminal of a voltage source. The base of the transistor 106 is also connected through a resistor 111 to the junction of series connected resistors 112 and 113 which connect the emitter to the ground bus 114. The collector terminal of the transistor 106 is connected directly to the negative power supply bus 110. The emitter terminal is also connected through a capacitor 115 to the junction of the resistors 108 and 109, which serves to provide a low impedance path for the operating frequency but prevents the D.C. voltage from being applied to the junction point of resistors 108 and 109, and hence preventing a change in bias on the base of the transistor 106. This circuit arrangement serves a function similar to the circuit connection of the transistor 67 (FIG. 2B) of the subcarrier generator unit, thus preventing excessive loading of transistor 106 by the filters 104 and 104B. The output from the emitter follower circuit arrangement 105 is coupled by a capacitor 116 to an amplifier 117 (FIG. 2A) and is also coupled by a capacitor 118 (FIG. 2C) to an amplifier 120. The amplifiers 117 and 120 which are low distortion class A amplifiers both amplify and isolate the tone received from the common emitter follower circuitry 105. The amplifier 117 is comprised of a transistor 122, the base of which is connected to the capacitor 116. The output of the amplifier 117 is coupled by a capacitor 123 to the input of a limiter 125.

The limiter 125 is comprised of PNP transistors 126 and 127. The transistors 126 and 127 have a common emitter connection through a resistor 128, and the collector terminal of the transistor 126 is connected directly to the bus 110, while the collector of the transistors 127 is connected through a resistor 130 to the bus 110. The base terminal of each transistor 126 and 127 is connected through a resistor 132 and 133, respectively to the bus 110. The transistor 126 clips the signal during one half cycle due to the base-emitter cut-off characteristics of the transistor. The transistor 127 clips the signal during the other half cycle in the base-emitter circuit due to the saturation of the base-emitter junction. The circuitry of transistor 127 also provides gain, in that it forms a grounded base amplifier. A thermistor element 135 serves to keep the level of the signal constant regardless of temperature changes. The limiter 125 provides a constant amplitude signal to a discriminator driver 140, regardless of the line level changes. It removes the attenuation or amplitude modulation of the signal by clipping the signal close to its center within the 6 db limit, thus leaving only the frequency modulated portion of the tone. The limiter stage 125 is symmetrical and provides a heavy limiting action thus presenting a square wave output signal on wire 141.

The discriminator driver 140 is coupled to the limiter 125 by a capacitor 142, one side of which is connected to an emitter follower portion of the discriminator driver 140 which is comprised of a PNP transistor 143. The transistor 143 is connected in a conventional emitter follower circuit configuration to provide a low impedance output for driving the discriminator amplifier driver stage 145. The transistor 143 is connected through a capacitor 144 to the base of transistor 145 of the amplifier driver stage. This stage 145 is a common emitter type which permits a moderate impedance looking back to the limiter and a moderate impedance driving source looking towards the discriminator transformer 149.

The discriminator 150 is connected to the collector terminal of the transistor 145 which removes any subcarrier tone, or in other words discriminates between the frequency modulation and the base frequency of the tone only being positive to a change in frequency. Connected to the output of the discriminator transformer 149 are diodes 151 and 152 which provide direct current output pulses to a low pass filter network portion of the discriminator to remove any residual carrier. The output pulses appear on wire 153 which are analog replicas of the system input pulses for this particular channel of information. These pulses may be adjusted by a potentiometer 154 so that their level is identical with the input pulses to the subcarrier generator. These output pulses may be applied to any external indication unit, such as a recorder, for example.

The output of amplifier 120 (FIG. 2C) is connected to a detector amplifier 160 through a coupling capacitor 161, and is also connected to a pulse width detector 162 by a wire 163. Both the detectors 160 and 162 are so called class B detectors, which are nonlinear. Because of the characteristics of class B detectors, during their operation they reflect a changing load back to the amplifier 120 as the tone frequency swings, which reduces the effect of the pulse width modulation. According to the present embodiment of the invention, the detector 160 uses the negative half cycles of frequency swing, and the detector 162 uses the positive half cycles of frequency swing to overcome the effect of this reduction.

Referring to FIG. 2C, the detector 160 is comprised of a PNP transistor 165, the base of which is connected to the coupling capacitor 161. The emitter terminal of the transistor 165 is connected through diodes 166 and 167 to ground over a bus 168 and wire 170. The diodes 166 and 167, which are connected in series, bias the emitter of the transistor 165 to saturation. The emitter of transistor 165 is also connected through a resistor 171 to the source of negative potential that is connected to bus 172 through wire 173. A capacitor 174 connects the collector terminal of the transistor 165 to the negative bus 172. The transistor 165 is normally non-conducting, and when the tone A reaches a predetermined level, which must be within the limits of its modulation, and yet high enough so that it won't be affected by any leakage, it conducts on the negative swings of the cycle to provide a rectified signal at its collector terminal which are in the form of unidirectional pulses. The capacitor 174 removes any residual tone frequency from these D.C. pulses and smooths out the signal. The collector terminal of the transistor 165 is direct current coupled by a resistor 175 to a so called relay driver 176.

The relay driver 176 is a Schmitt trigger circuit or monostable multivibrator, which returns to one definite condition in the absence of a signal. The monostable multivibrator 176 is comprised of transistors 177 and 178, which are connected in a circuit arrangement so that the transistor 177 will fire when the negative D.C. output signal applied to its base reaches a certain value, thus causing a steady source of energy at the collector terminal of the transistor 178. This energy may operate a relay for example, that would be operatively connected to output wire 180 (FIG. 2D). The circuit arrangement of the trigger circuit 176 provides a snap acting electronic switching control which gives an instantaneous response to the presence of its associated tone for operating an apparatus such as a recorder motor for example.

Figure 4:
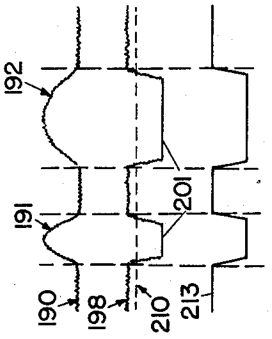
FIG. 4 illustrates typical waveforms to show the detection of the pulse width modulation information channel.

The detector 162, which is a class B detector, is connected to the output of the amplifier 120 by the wire 163. This detector is comprised of a transistor 181, which is an NPN transistor so that it operates only on the positive half cycles of the signal. The emitter terminal of the transistor 181 is connected through a resistor 182 to the negative bus 172, and the collector terminal is connected through a resistor 183 to the ground bus 168. A capacitor 184 connects the collector terminal of the transistor 181 directly to the ground bus 168 in parallel with the resistor 183. This arrangement provides a short circuit to the frequency of the tone but not to the frequency of the signal pulses, which may be in the order of 50 milliseconds for example. The fact that the detector 162 works on the positive half cycles of the frequency, and the detector 160 works on the negative half cycles, causes the waveform which operates the trigger circuit 176 and the waveform at the output of the detector 162, to be isolated from each other. The positive D.C. pulses occur at the collector output of the transistor 181 and are applied through a capacitor 186 to provide an A.C. coupling to a clipper amplifier 188. The waveform at the capacitor 186 is referred to at 190 of FIG. 4. As shown in FIG. 4 this waveform is ragged as it contains a substantial amount of residual tone frequency. The waveform 190 is shown as having a portion 191 which represents an input pulse of relatively short duration on the input wire 10 of the subcarrier generator and a portion 192 which represents a pulse of slightly longer duration on the input wire 10.

The clipper amplifier 188 (FIG. 2D) is comprised of a PNP transistor 195, the base terminal of which is connected to the capacitor 186 and the emitter terminal of which is directly connected to the ground bus 168. The collector terminal of the transistor 195 is connected through a resistor 196 to the negative bus 172 and is also connected through a capacitor 197 to the ground bus 168. The capacitor 197 further removes any residual tone frequency of the pulse, which is now amplified at the collector output of the transistor 195 as substantially shown in the waveform 198 of FIG. 4.

The clipper amplifier 188 includes a diode 200, which is biased to a certain value for clipping off the amplified waveform as illustrated by the straight line portion 201 of the waveform 198 when it swings through a certain level. The amplifier 188 is an overdriven amplifier, wherein inverse limiting is applied by the action of the coupling diode 200. The overdriving of the transistor 195 provides a square wave output at constant amplitude regardless of the tone level change on the line.

The output from the clipping diode 200 is applied through a resistor 203 to an emitter follower 205. The emitter follower, which provides a low impedance constant amplitude signal output, 205 includes a PNP transistor 206, the base terminal of which is connected through a resistor 207 to the negative bus 172 and through a resistor 208 to the ground bus 168, as well as being connected to the coupling resistor 203. The values of the resistors 207 and 208 are such as to provide a bias to the base of the transistor 206, thus clipping the waveform 198 close to its base line, as illustrated by the dotted line 210 of FIG. 4, at the circuit junction 211.

A capacitor 212 is connected between the base of the transistor 206 and the ground bus 168 to aid in removing any residual tone frequency from the signal. At the emitter output terminal of the transistor 206 a waveform results which is illustrated at 213 of FIG. 4. This waveform, which is applied to output wire 214 is identical to the pulses which were applied by shorting the inputs 10 of FIG. 1A.

Thus, in accordance with this embodiment of the invention, when a particular tone is detected by the demodulator unit, energy is applied to the output wire 180, which may be used to start a recording motor for example. This particular tone may then be pulsed width modulated at a constant amplitude when a channel of information emanates by way of the input 10 to provide an exact replica of the input pulses at the output 214 of the demodulator unit. Simultaneously, this same tone may be frequency modulated upon the application of information in the form of variable voltage pulses on the input 12 as shown in FIG. 1A to provide an exact replica of these variable voltage pulses at the output 153 of the demodulator unit. When the base frequency of the tone is not being modulated, other digital information may be applied to the input 16 of FIG. 1A to cause the frequency to shift downwardly to provide other information at the output 153 of the demodulator unit. The output at wire 153 in this instance will be of constant amplitude, because the base frequency is close to the lower limit of its band width, and be of a polarity opposite to that of the variable voltage pulses.

In practice, a telemetering system according to this embodiment of the invention was arranged to simulcast four distinct tones either directly on a 600 ohm balanced transmission circuit, or through carrier transmission using a single side band, voice channel carrier transmitter. The four tones each comprised a frequency of 675, 910, 1230 and 1610 cycles per second, respectively. The frequency modulated input was assigned to an analog information channel whereby variable quantities were expressed as a series of voltage pulses of varying magnitudes. A maximum input pulse of approximately eight volts negative produced a deviation in the tone frequency of approximately 15%, and these voltage pulses occurred at a rate of approximately 30 pulses per second. Also, the pulse width modulated portion, which was assigned to a digital information channel, produced a reduction in the tone amplitude of approximately 6 db, and the lengths of these pulses were variable between 60 milliseconds and 150 milliseconds.

Figure 6:
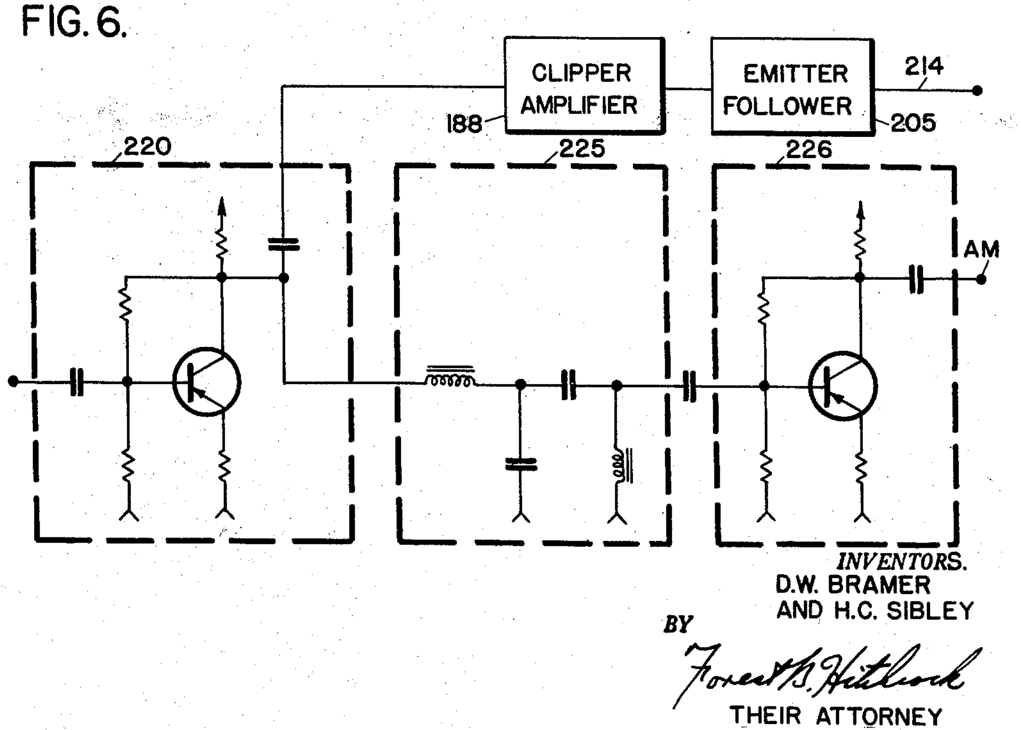
FIG. 6 illustrates schematically the apparatus and circuitry according to the modification.
Figure 5:
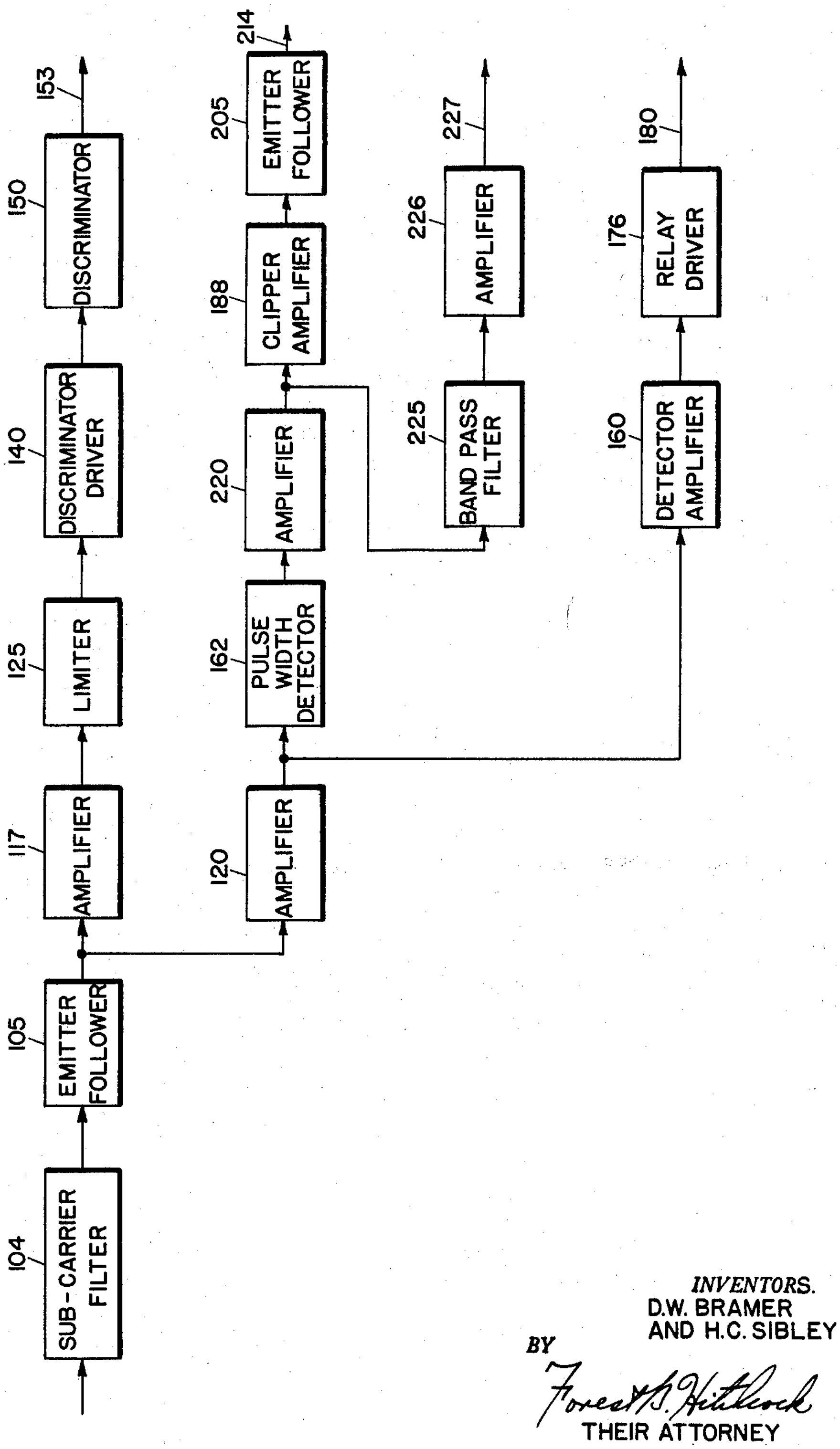
FIG. 5 illustrates in block diagram, a modified form of the demodulating portion of the system; for detecting an additional channel of information.

Referring to FIGS. 5 and 6, a modified demodulator unit is illustrated, which shows additional stages that may be connected to the unit for detecting variable amplitude modulation of a respective tone thereby providing another channel of information.

When using the modified demodulator unit, a separate information source may be connected to the input 10 (FIG. 1A). This separate information source is expressed through a potentiometer for example, by variable voltage pulses, the durations of which are less than the shortest pulse that is required for the pulse width modulation channel of information. If the shortest pulse for the pulse width modulation, for example, is to be 50 milliseconds, the duration of the variable pulse will be in the neighborhood of 30 milliseconds for example. In constructing the modified demodulator unit, a conventional class A amplifier 220 is connected between the output of the pulse width detector 162, and the input of the clipper amplifier 188 to provide additional amplification for the signal so that the pulse width detecting portion will not be affected by the information pulses which may vary in amplitude to decrease the tone down to 2 db for example.

The class A amplifier 220 is then connected at its output directly to a band pass filter 225, which is so constituted to pass pulses in the neighborhood of 30 milliseconds, for example, but filters out those pulses of 50 milliseconds' duration and above. To the output of the filter 225, there is connected a linear amplifier 226, which amplifies these 30 millisecond pulses to produce an output wire 227, variable voltage pulses of an amplitude which correspond to the amplitude of the 30 millisecond input pulses.

Having described a telemetering method and system according to two specific embodiments of the present invention, it is desired to be understood that this form is illustrated to facilitate in the disclosure of the invention rather than to limit the number of forms which it may assume; and, it is to be further understood, that various modifications, adaptations, and alterations may be applied to the forms shown to meet the individual requirements of practice, without in any manner departing from the spirit or scope of the present invention.

What we claim is:

1. In a communication system for reproducing at a receiving location three channels of information pulses applied at a transmitting location wherein a generated frequency is increased proportional to the amplitude of each pulse applied to a first information channel, and the frequency is pulse width modulated by decreasing the amplitude of the frequency a predetermined amount in response to and for the duration of each pulse applied to a second information channel, each said second channel pulse having a fixed minimum duration, and wherein said frequency is amplitude modulated proportional to the amplitude of each pulse applied to a third information channel, each said third channel pulse having a maximum duration less than the minimum duration of each second channel pulse applied to the second information channel, comprising means operative to receive the composite frequency and pulse width and amplitude modulated frequency, a first and second means operative to amplify and isolate the received frequency into two branches, limiting means operatively connected to the first amplifying means effective to clip the amplified frequency to provide at its output a frequency at a constant amplitude, frequency discriminating means electrically connected to the output of the limiting means operative to provide an output voltage having an amplitude proportional to an input frequency higher than the generated frequency, means electrically connected to the discirimінating means effective to rectify the output of the discriminating means to provide at its output D.C. voltage pulses having an amplitude proportional to the increased frequency corresponding to the input pulses applied to the first information channel, detecting means electrically connected to the second amplifying means effective to detect on one half cycle the frequency of the occurring pulses applied to the second information channel, a third amplifying means electrically connected to the output of the detecting means operative to increase the amplitude of the detected pulses, clipping means electrically connected to the output of the detecting means effective to provide substantially square wave voltage pulses of a duration corresponding to each second channel information pulse, and filtering means electrically connected to the output of the third amplifying means effective to conduct linearly voltage pulses having a duration less than the minimum duration of the second channel information pulses, whereby the three channels of information pulses are produced separately at the receiving location.

2. In a system according to claim 1, wherein the generated frequency is decreased in response to each pulse of a fourth information channel at times when the pulses applied to the first information channel are absent, and wherein the rectifying means is effective to produce a D.C. voltage pulse of opposite polarity in response to each voltage pulse applied to the fourth information channel.

(References on following page)

References Cited by the Examiner

UNITED STATES PATENTS

| | | | |
|---|---|---|---|
| 2,462,874 | 3/49 | Labin | 179—15 |
| 2,477,625 | 8/49 | Labin | 179—15 |
| 2,583,484 | 1/52 | Guanella | 179—15 |
| 2,676,202 | 4/54 | Filipowsky | 179—15 |
| 2,676,203 | 4/54 | Phelps | 178—66 |
| 3,045,071 | 7/62 | Matthews et al. | 179—15 |

DAVID G. REDINBAUGH, *Primary Examiner.*

THOMAS B. HABECKER, *Examiner.*